H. R. PONTON.
PHOTOGRAPHIC SHUTTER.
APPLICATION FILED FEB. 24, 1920.

1,391,790.

Patented Sept. 27, 1921.
4 SHEETS—SHEET 1.

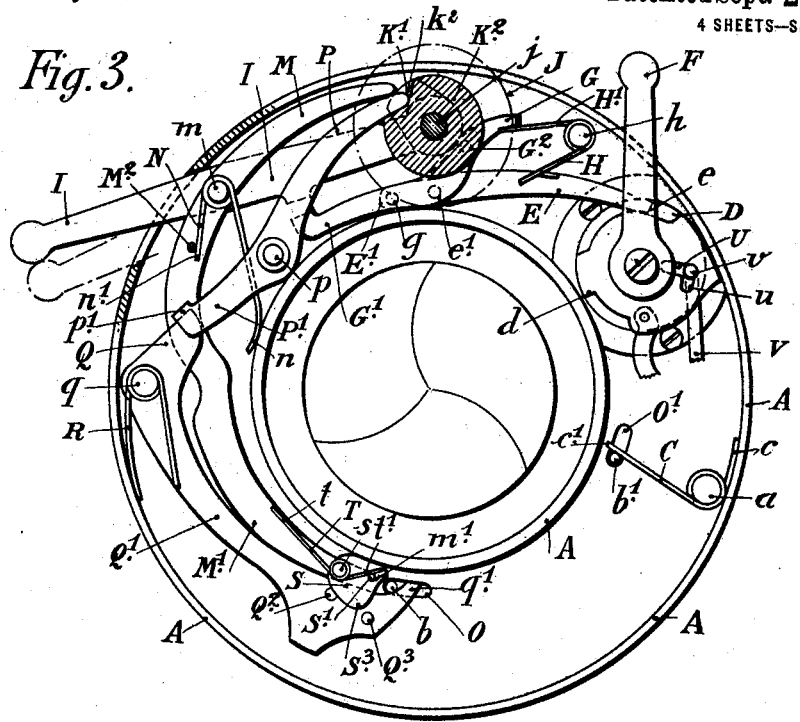
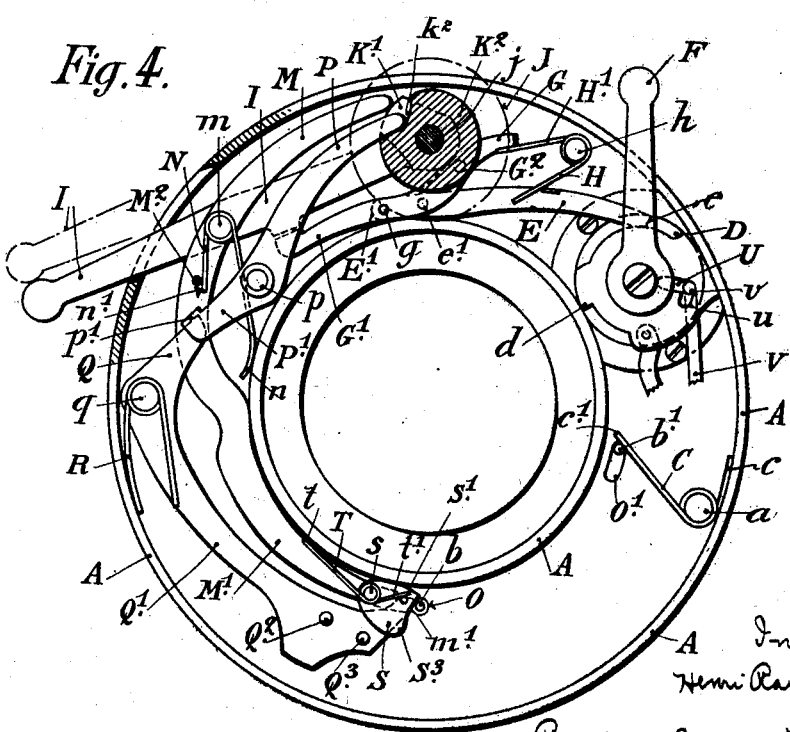

H. R. PONTON.
PHOTOGRAPHIC SHUTTER.
APPLICATION FILED FEB. 24, 1920.

1,391,790.

Patented Sept. 27, 1921.
4 SHEETS—SHEET 3.

Inventor:-
Henri Raymond Ponton
By Mauro, Cameron, Lewis & Massey
Attorneys

H. R. PONTON.
PHOTOGRAPHIC SHUTTER.
APPLICATION FILED FEB. 24, 1920.
1,391,790.
Patented Sept. 27, 1921.
4 SHEETS—SHEET 4.
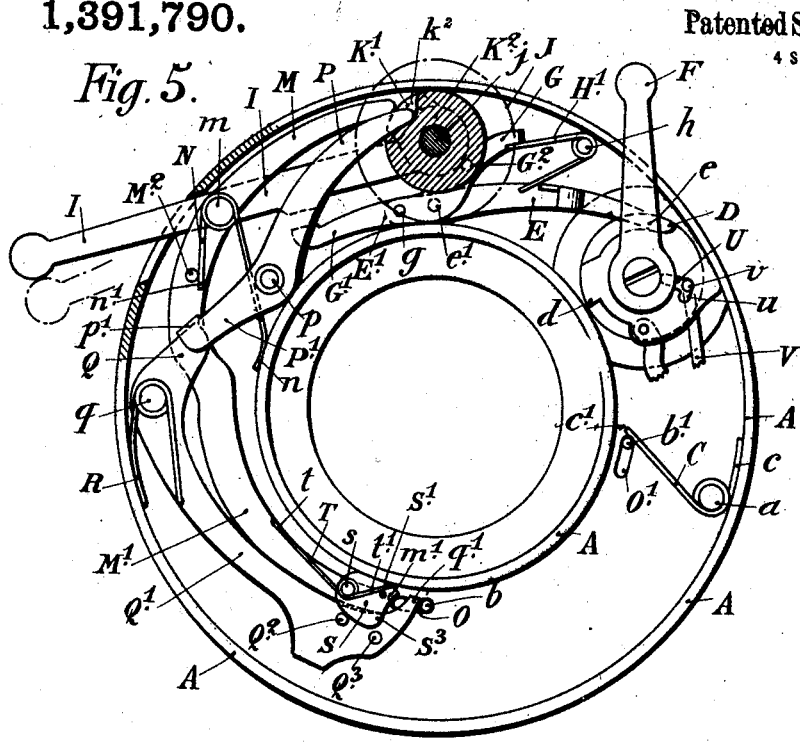
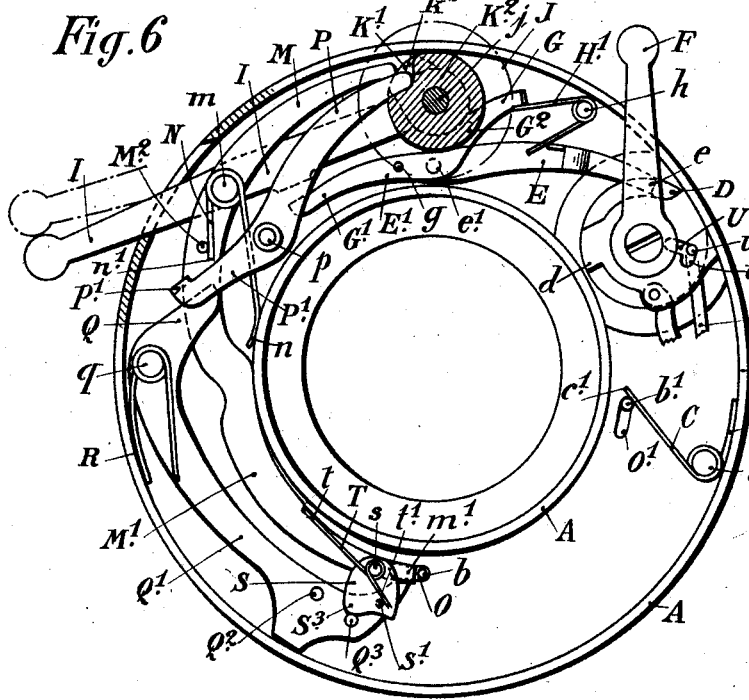
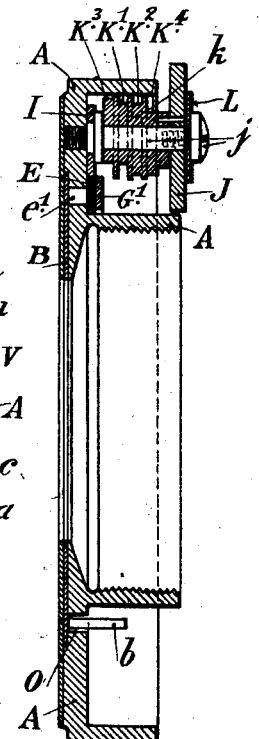

UNITED STATES PATENT OFFICE.

HENRI RAYMOND PONTON, OF PARIS, FRANCE.

PHOTOGRAPHIC SHUTTER.

1,391,790. Specification of Letters Patent. Patented Sept. 27, 1921.

Application filed February 24, 1920. Serial No. 360,856.

(GRANTED UNDER THE PROVISIONS OF THE ACT OF MARCH 3, 1921, 41 STAT. L., 1313.)

*To all whom it may concern:*

Be it known that I, HENRI RAYMOND PONTON, a citizen of the Republic of France, residing at Paris, France, have invented new and useful Improvements in Photographic Shutters, (for which I have filed applications in France, Nov. 26, 1918, Patent No. 501,844; in Belgium, Dec. 22, 1919, and in Switzerland, Dec. 29, 1919,) which invention is fully set forth in the following specification.

This invention has for its object to provide an improved photographic lens shutter of the known type comprising pivoted sector-shaped plates carried by a movable ring.

The improved shutter is constructed, like other known shutters of the same type, in such a manner as to be capable of being set at will by means of a single setting member, for working either for bulb exposure, for time exposure or for timed exposure at any desired speed of a given series of speeds, such as for instance a second, 1/2 second, 1/5 second, 1/50 second, 1/100 second or 1/300 second.

One of the essential characteristic features of the improved shutter consists of an apparatus designed to keep the spring for producing variable timed exposure cocked, while the operator is taking photographs with bulb exposure or time exposure. In the various shutters hitherto known, if the spring for timed exposure is cocked, any actuation of the releasing lever will uncock the spring. The consequence is that if through inadvertence, the exposure is made for bulb exposure or for time exposure, and the timed exposure spring has previously been cocked, then the useless uncocking of the spring will cause a jolt to the entire apparatus. It may also be desirable to cock the timed exposure spring first, in order to be able at will, after this cocking has been effected, to take a photograph with timed exposure, or with bulb exposure, or with time exposure. In other words, in the improved shutter, the cocking of the timed exposure spring may be effected at any time before focusing, and from that moment onward the operator is able at will to take a timed photograph or a time photograph with bulb or time exposure without having necessarily to uncock the timed exposure spring when bulb or time exposure is being used.

This result is obtained according to this invention by doubling the usual catch which keeps the timed exposure spring cocked. More strictly speaking, this catch is associated with a lever which comes into operation and moves into the path of the releasing lever only in the case where the shutter has been set for timed exposure. So long as the shutter is set for working with bulb exposure or time exposure, the lever associated with the catch will remain out of the range of the releasing lever.

In a practical form of this invention the apparatus for setting the shutter comprises on the axle of an adjusting disk, a series of cams, one of which controls the coming into operation of the actuating mechanism for producing bulb exposure. Another cam controls the coming into operation of the actuating mechanism for effecting time exposure; and a third cam serves to move into the path of the releasing lever the lever that is associated to the releasing catch of the timed exposure mechanism, while the fourth cam of variable contour controls in the known manner a pneumatic brake for retarding the closing of the shutter when the latter is required to give timed exposure.

This constructional form of the invention is illustrated by way of example in the accompanying drawings in which:

Figure 1 is a front elevation of the entire shutter, the cover being removed, and the parts being shown in the positions they occupy when the shutter is set for time exposure; the timed exposure mechanism being shown uncocked in full lines.

Fig. 2 is a corresponding front elevation in which the mechanism for actuating the shutter to give time exposure has been removed in order to show more clearly the working of the bulb exposure mechanism. The full lines show the parts in the positions they occupy when at rest; the dot and dash lines show the parts in the positions they assume as a result of the depression of the releasing lever, that is to say, the open position of the shutter.

Fig. 3 is a similar front elevation showing the parts which come into action for giving time exposure; these parts being shown in the positions they occupy when at rest (starting position with closed shutter).

Fig. 4 is a corresponding front elevation showing the parts in the position they occupy as the result of the depression of the releasing lever, for producing the opening of the shutter; these parts retaining these positions so long as the lever is kept depressed.

Fig. 5 shows the positions occupied by the parts when the releasing lever has been let go, the shutter remaining open so long as the releasing lever is not depressed a second time.

Fig. 6 shows the positions occupied by the parts after the releasing lever has been depressed the second time, the letting go of the said lever after this second depression serving to close the shutter.

Fig. 9 is a section taken along the axis of the apparatus, showing only the regulating cam apparatus and the pivotal connection of the releasing lever.

Figure 1:
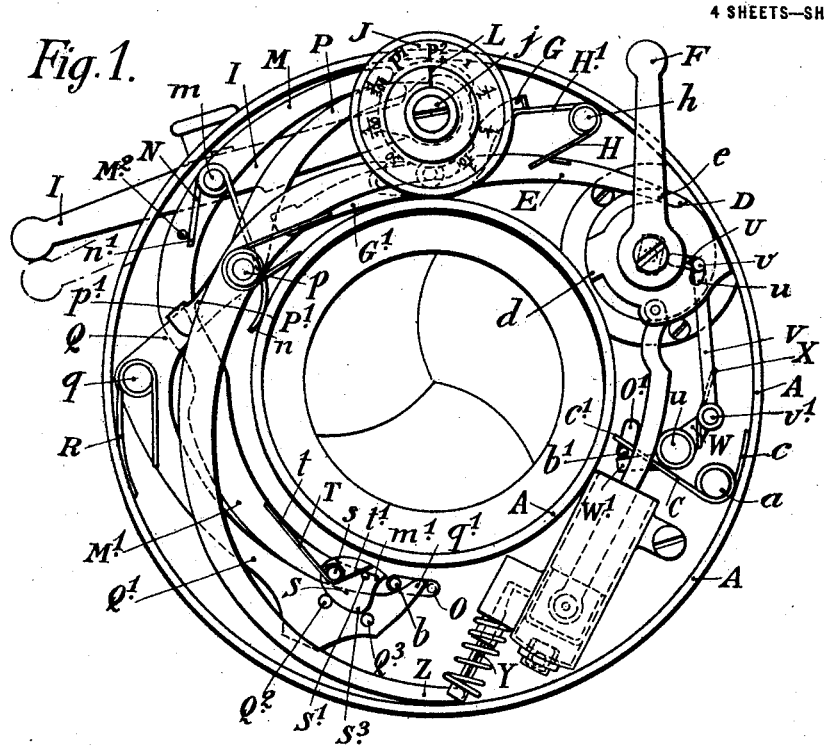

The improved shutter comprises, as in known apparatus of the same type, a body A which forms with its outer part, an annular box for accommodating the various mechanisms for actuating the shutter. Upon this box there is rotatably mounted a ring B of known construction which when moved in one direction causes the plates to move inward and close the shutter aperture, whereas when moved in the opposite direction it causes the said plates to move out of the way and uncover the shutter aperture. In other words, the opening of the shutter aperture is produced in the known manner by moving in a counter-clockwise direction a knob $b$ carrying the ring B. The closing of the shutter aperture is produced by the ring being moved in the opposite direction by the action upon a knob $b^1$ of a return spring C which is wound around an axle $a$ carried by the box A. One end $c$ of this spring bears against the said box, while its other end $c^1$ bears against the knob $b^1$ of the ring.

The improved apparatus comprises in the known manner a barrel D containing the spring for producing timed exposure, the cocking of this spring being effected by the engagement of a tooth $d$ of a ratchet wheel behind the nose $e$ of a catch E.

This engagement is produced by depressing the cocking lever F. The actuation of the ring B by means of the spring in the barrel D in the example shown, is produced by means of gear hereinafter described, which causes the ring to be moved by the knob $b^1$ in a counter-clockwise direction.

According to this invention, the catch E which is adapted to pivot on the box A around an axle-pin $e^1$, is extended rearwardly in the form of a tail $E^1$ carrying a pivot pin $g$ for a rocking beam G—$G^1$. A spring coiled around an axle $h$ carried by the box A, bears with one of its branches H upon the catch E, and with its other branch $H^1$ against the arm G of the rocking beam G—$G^1$.

The spring H—$H^1$ has thus a constant tendency to keep the catch E depressed, while it has a tendency to maintain the arm G of the rocking beam raised, and thereby keep the arm $G^1$ of the said rocking beam out of the path of the releasing lever I.

It will be readily perceived that the cocking lever F can be operated to engage the tooth $d$ behind the nose $e$ of the catch (position indicated in dot and dash lines in Fig. 2) without bringing the rocking beam G—$G^1$ into the path of the releasing lever I. In the cocking operation the catch E rises to allow the tooth $d$ to pass, by pivoting around the axle-pin $e^1$ and slightly moving the spring H out of operative position.

As will be hereinafter seen, a cam of the setting apparatus when moved into the position for timed operation, causes the arm G of the rocking beam to move down by the latter pivoting around the axle $g$ and consequently causing the arm $G^1$ to rise which is thereby brought into the path of the releasing lever I.

The apparatus for setting the shutter comprises a disk J mounted on the end of a sleeve $k$ adapted to rotate on an axle-pin $j$ fixed to the box A (Fig. 9). On this sleeve are formed four cams $K^1$, $K^2$, $K^3$, $K^4$ which, by the rotation of the disk in the desired direction, can be brought into the desired position for the various modes of operation of the apparatus, whereby at the same time suitable inscriptions carried by the disk are brought opposite a fixed pointer L carried by the axle $j$. These inscriptions are as follows: P.1 (bulb exposure); P.2 (timed exposure). 1 (timed exposure of 1 second); 1/2 (timed exposure of 1/2 second); 1/5 (timed exposure of 1/5 second); 1/25 (timed exposure of 1/25 second); 1/50 (timed exposure of 1/50 second); 1/100 (timed exposure of 1/100 second); 1/300 (timed exposure of 1/300 second).

Figure 2:
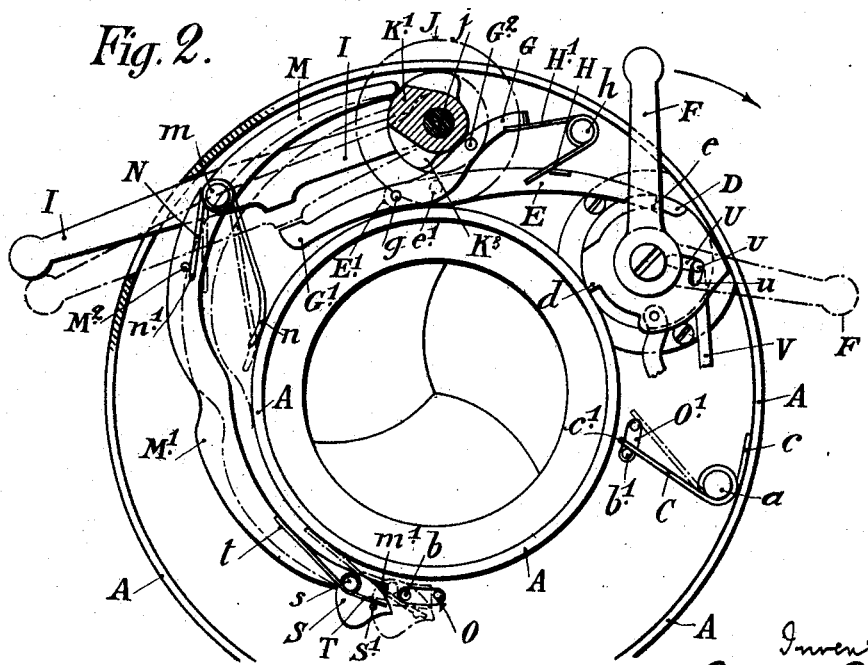

When the disk J has been turned in such a manner that the inscription P.1 (bulb exposure) is situated opposite the fixed pointer L, the cam $K^1$ is situated in the position shown in Fig. 2. In this position it raises by means of its lobe, the arm M of a rocking beam M—$M^1$ that is fulcrumed on an axle $m$ carried by the releasing lever I. Around this axle there is coiled a spring N one end $n$ of which bears against the box A, whereas its other end $n^1$ bears against a pin $M^2$ projecting from the arm $M^1$ of the rocking beam $M-M^1$.

As will be seen, the spring N has a tendency normally to push the arm $M^1$ of the rocking beam $M-M^1$ outward, and thereby to raise the releasing lever I.

In the position shown in full lines in Fig. 2, that is to say, when the arm M of the rocking beam $M-M^1$ is raised by the cam $K^1$, the end $m^1$ of the arm $M^1$ is opposite and almost touching the knob $b$ of the ring B. If the releasing lever I be depressed, the latter will turn on the axle $j$ which serves as its pivot, and by this movement it will carry with it the rocking beam $M-M^1$, and thereby compress the spring N and exert a pressure upon the knob $b$. At the same time the knob $b^1$ is moved through the same distance so as to compress the opposing spring C. In short, the parts are moved into the position indicated in dot and dash lines in Fig. 2, the movement of the knob $b$ having caused in the known manner the opening of the shutter aperture by the moving apart of the movable plates.

The shutter remains open so long as pressure is being applied to the releasing lever I, that is to say, so long as the latter is kept in the position indicated in dot and dash lines. If the said lever is let go, the spring N in expanding will return the parts into the positions shown in full lines, whereas the expansion of the spring C will assure the return of the shutter plates into the closed position. The paths of the knobs $b$, $b^1$ are limited in the known manner by their movement in their respective slot guides O, $O^1$.

As will be seen, the operation of the mechanism for bulb exposure remains absolutely without any effect upon the catch E for setting the timed exposure mechanism, and upon the rocking beam $G-G^1$ whose arm $G^1$ is outside the path of the releasing lever I.

By turning the setting disk J in such a manner as to bring the inscription P.2 opposite the fixed pointer, the apparatus is set for operating for the purpose of producing time exposure, as shown in Fig. 3.

In this position a second cam $K^2$ has roated in such a manner as to present a notch $k^2$ opposite the free end of the arm P of the rocking beam $P-P^1$ fulcrumed on an axle $p$ carried by the box A.

The rocking beam $M-M^1$ whose arm M continues to bear with its free end upon the lobe of the cam $K^1$, has to remain in the position shown in full lines in Fig. 2.

Figure 7:
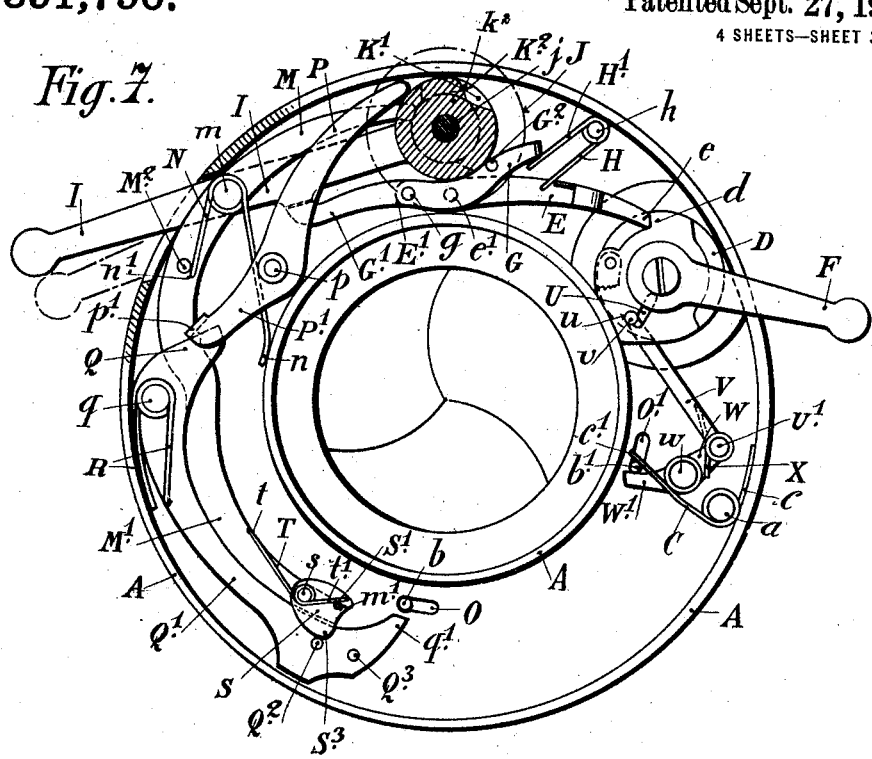
Fig. 7 shows the shutter set for timed exposure, the mechanisms for producing bulb exposure and time exposure being inoperative, and the rocking beam associated with the catch for cocking the spring for timed exposures having been brought into the path of the releasing lever.
Figure 8:
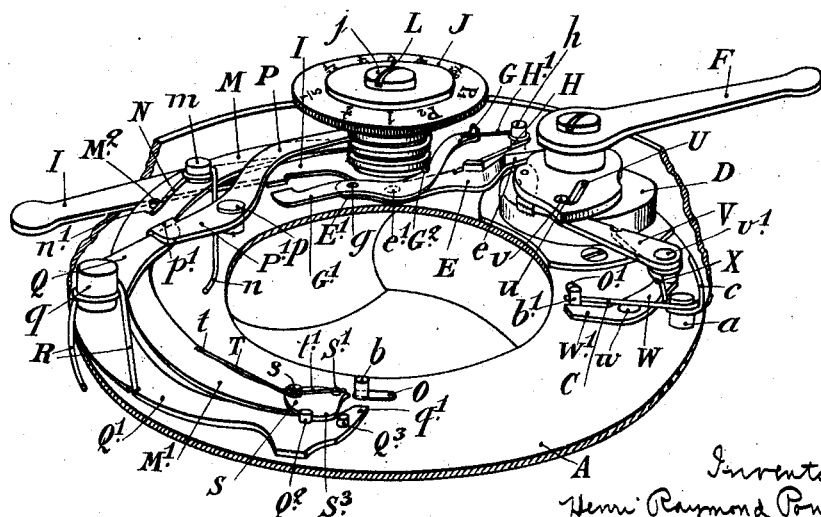
Fig. 8 is a perspective view of the actuating mechanisms for producing bulb exposure and time exposure, also of the regulating cam apparatus, and of the mechanism for setting the shutter for timed exposures.

Normally, when the cam $K^2$ is bearing upon the arm of the rocking beam P with any portion of itself other than the notch $k^2$, the said rocking beam will occupy the position shown in Fig. 7. In this position it acts by means of the finger $p^1$ upon the free end of the arm Q of a rocking beam $Q-Q^1$ fulcrumed on an axle $q$ carried by the box A. By this means this rocking beam is held in a position in which the end $q^1$ of the arm $Q^1$ is situated outside the path of the actuating knob $b$. R is a spring which is coiled around the pivot pin $q$ and bears with one end against the box A and at its other end against the arm $Q^1$. This spring has a constant tendency to raise the nose $q^1$ and move it into the position shown in Fig. 3.

When the free end of the arm P of the rocking beam $P-P^1$ is engaged in the notch $k^2$ of the cam $K^2$, the spring R is able to expand and move the arm $P^1$ of the rocking beam $P-P^1$ aside. The parts will thus assume the positions shown in full lines in Fig. 3.

If now the operator presses the releasing lever I, this will cause, as in the case of setting for bulb exposure, a movement of the rocking beam $M-M^1$ with the result of pushing the actuating knob $b$ from left to right. In this movement this knob slides over the nose of the rocking beam arm $Q^1$, depressing the latter until when the said knob arriving at the end of its guide slot O, the said knob is imprisoned in that position by the nose $q^1$ that is raised by the action of the spring R, as shown in Fig. 4.

From this instant onward the releasing lever I can be let go, whereupon the latter as well as the rocking beam $M-M^1$ will be returned by the action of the spring N into their initial positions. The parts thus assume the positions shown in Fig. 5. The shutter which has been opened by the depression of the releasing lever, remains open so long as it is not operated anew by the said releasing lever.

If the releasing lever is depressed a second time, this will bring into action an angle member S pivoting on a pin $s$ carried by the arm $M^1$ of the rocking beam $M-M^1$. A spring T coiled around the pin $s$ presses with one end $t$ upon the arm $M^1$, and with its other end $t^1$ upon a knob $S^1$ carried by the said angle member S. The spring T has a constant tendency to rotate the angle member in such a manner as to push the knob $S^1$ outward. A boss $Q^2$ carried by the arm $Q^1$, has on the contrary a constant tendency under the action of the spring R which is more powerful than the spring T, to bring the angle member into the position shown in Fig. 3.

The angle member S does not operate in any way when the apparatus is used with bulb exposure.

In time exposure on the contrary the angle member comes into action as follows:—

In the passage of the parts from the position shown in Fig. 3 into the position shown in Fig. 4, that is to say, in the first depression movement of the releasing lever which causes the opening of the shutter, the angle member S follows simply the rocking beam M—M¹ because it is held by the knob b; it therefore assumes the position shown in Fig. 4.

When the parts come into the position shown in Fig. 5 owing to the releasing lever I being let go, the angle member S has simply returned into the position shown in Fig. 3, because the boss Q² prevents the spring T from acting.

If now on starting from the position shown in Fig. 5, the releasing lever I be again depressed, the arm M¹ and through it the angle member S, will be moved. The nose S³ of this angle member engages, in this movement, between the boss Q² and a second boss Q³ of the arm Q¹, and it will consequently rock on the pin s, while bearing upon the boss Q³. The pressure upon the lever I thus produces through the medium of the arm M¹ and the angle member S, an action upon the boss Q³, with compression of the spring R as shown in Fig. 6.

The nose q¹ of the rocking beam Q¹ thus by moving out of the way, releases the knob b. The result is that if the releasing lever I be let go, the counter spring C is able to act upon the knob b¹ and move the shutter plates into their closed position.

It is clear that this procedure for time exposure does not affect in any way the position of the catch E and of the rocking beam G—G¹ associated with this catch.

In short, it is immaterial whether the timed exposure spring is cocked or not cocked at first, and bulb exposure or time exposure can be given without either of these operations causing a premature disengagement of the catch E, if the latter should happen to be cocked.

In working with timed exposure, of course the spring contained in a known way in a barrel D, must first be cocked. This cocking produces as above stated, the engagement of the catch E behind a tooth d of a ratchet wheel. Once this cocking has been effected, the inscription 1, 1/2, 1/5, etc., (according to the speed which it is desired to obtain) is brought by means of the disk J opposite the pointer L.

Whatever the said speed may be, a cam K³ is always caused to come into operation so as to act upon a knob G² projecting from the arm G of the rocking beam G—G¹, that is associated with the catch E. The cam K³ in acting upon the knob G² causes the rocking beam G—G¹ to pivot on the pin g and thus bring the arm G of the said rocking beam into the path of the releasing lever I. From this moment onward it is sufficient for taking a timed photograph at any desired speed, to move the cam K³ into the desired position in order that this speed shall be indicated opposite the fixed pointer M, and then to depress the releasing lever I. In this depressing movement, the said lever acts upon the arm G of the rocking beam G—G¹ and the latter carries with it the catch E which releases the tooth d and causes the timed exposure spring to act.

The operation of the shutter under the action of the unstressing of the timed exposure spring, is produced by a known means such as that shown by way of example in the drawings. In the disk carrying the tooth d there is formed a slot U serving as a guide for a pin v that is carried by one of the ends of a connecting rod V pivoted at its other end v¹ to the arm W of a rocking beam W—W¹ fulcrumed on a pin w carried by the box A. The end of the arm W¹ is in constant contact at its underside with the knob b¹ which has a tendency to be forced by the counter spring C in a clockwise direction in order to close the shutter. A spring X coiled around the pin v¹ bears with one end upon the connecting rod V and with its other end upon the arm W of the rocking beam. It has thus a constant tendency to cause the connecting rod V and the arm W to move toward each other, and to engage the pin v at the bottom of a notch u in the guide slot U (Fig. 7).

On pressing the releasing lever I, the tooth d is released as hereinbefore stated, by the rising of the catch E, the timed exposure spring expands and the disk that carries the said tooth turns and moves with it the connecting rod V and through the latter moves also the rocking beam W—W¹ whose arm W¹ raises the knob b¹, thereby effecting the opening of the shutter.

Once the timed exposure spring has become unstressed, the counter spring C comes into action and returns the knob b¹ into its starting position, thereby closing the shutter.

The variations in the speed of the unstressing of the spring may be produced by any known means comprising for example as shown in Fig. 1, a spindle Y acting upon the exhaust orifice of an air brake. The said spindle assumes various positions controlled by the lobe of a cam K⁴ which is moved by the disk J opposite the pointer L, thereby raising more or less the end of an operating lever Z.

Having now particularly described and ascertained the nature of my said invention and in what manner the same is to be performed, I declare that what I claim is:—

1. In a photographic shutter, the combination with a blade mechanism actuated by bulb, time and timed mechanisms, a releasing lever for the actuating mechanisms, a spring drive for the timed mechanism including a cocking device to set said drive preliminary to the operation of the timed mechanism for a timed exposure, and a catch for holding the cocking device cocked, of a setting mechanism for the actuating mechanisms including an element associated with the catch to trip the latter, said element being positioned by the setting mechanism to be engaged by the depressed releasing lever only when the setting mechanism is set for timed exposure, the depression of the releasing lever moving said element to trip the catch from the cocking device to free the spring drive of the timed mechanism, said element being positioned clear of the movement of the releasing lever when the setting mechanism is set for either bulb or time exposure.

2. In a photographic shutter, the combination with a blade mechanism actuated by bulb, time and timed mechanisms, a releasing lever for the actuating mechanisms, a spring drive for the timed mechanism including a cocking device to set said drive preliminary to the operation of the timed mechanism for a timed exposure, and a pivoted catch engaging at one end with the cocking device to hold the latter cocked, of a rocking lever pivoted between its ends to the other end of the catch, and a setting mechanism for the actuating mechanisms operating when set for a timed exposure to bear on one end of the rocking lever to position the other end of the same to be engaged by the releasing lever when the latter is depressed, the depression of the releasing lever operating to move the rocking lever to trip the catch from the cocking device to free the spring drive of the timed mechanism, the said rocking lever being positioned clear of the releasing lever when the setting mechanism is set for either bulb or time exposure.

3. In a photographic shutter, the combination with a blade mechanism actuated by bulb, time and timed mechanisms, a releasing lever for the actuating mechanisms, a spring drive for the timed mechanism including a cocking device to set said drive preliminary to the operation of the timed mechanism for a timed exposure, and a pivoted catch engaging at one end with the cocking device to hold the latter cocked, of a rocking lever pivoted between its ends to the other end of the catch, and a setting mechanism for the actuating mechanisms including a cam to bear on one end of the rocking lever when the setting mechanism is set for a timed exposure to move the other end of the rocking lever into the path of the releasing lever when the latter is depressed, the depression of the releasing lever operating to move the rocking lever to trip the catch from the cocking device to free the spring drive for the timed exposure, the said cam being turned clear of the rocking lever when the setting mechanism is set for other exposures, the rocking lever being moved by a spring out of the path of the releasing lever.

4. In a photographic shutter, the combination with a blade mechanism actuated by bulb, time and timed mechanisms, a releasing lever for the actuating mechanisms, a spring drive for the timed mechanism, means for modifying the action of the spring drive to vary the timed exposures, a cocking device included in the spring drive to set said drive preliminary to the operation of the timed mechanism for a timed exposure, and a pivoted catch engaging at one end with the cocking device to hold the latter cocked, of a spring pressed rocking lever pivoted between its ends to the other end of the catch, and a setting mechanism including a rotatable member carrying cams spaced circumferentially around said member to set the actuating mechanism and also the means for modifying the action of the spring drive, the cam controlling the timed actuating mechanism operating to bear on one end of the rocking lever when the setting mechanism is set for a timed exposure to move the other end of the rocking lever into the path of the releasing lever when the latter is depressed, the depression of the releasing lever operating to move the rocking lever to trip the catch from the cocking device to free the spring drive for the timed exposure, the cam controlling the means for modifying the action of the spring drive being turned into active engagement with said modifying means simultaneously with the engagement of the cam controlling the timed actuating mechanism with the rocking lever, the said latter cams being turned clear of the mechanisms which they respectively control as the rotatable member is turned to bring the other cams into engagement with the mechanisms which they respectively control.

5. In a photographic shutter, the combination with a blade mechanism actuated by bulb, time and timed mechanisms, means for modifying the action of the timed mechanism, of a setting mechanism including a rotatable member carrying cams circumferentially spaced around said member to set respectively the actuating mechanisms and the modifying means, the cams controlling the timed mechanism and the modifying means acting simultaneously on such mechanism and means, and the cams controlling the bulb and time mechanisms operating at intervals different from each other and from the interval of operation of the cams controlling the timed mechanism and the modifying means.

Dated this 12th day of January 1920.

In testimony whereof I have signed this specification.

HENRI RAYMOND PONTON.